United States Patent Office 3,306,794
Patented Feb. 28, 1967

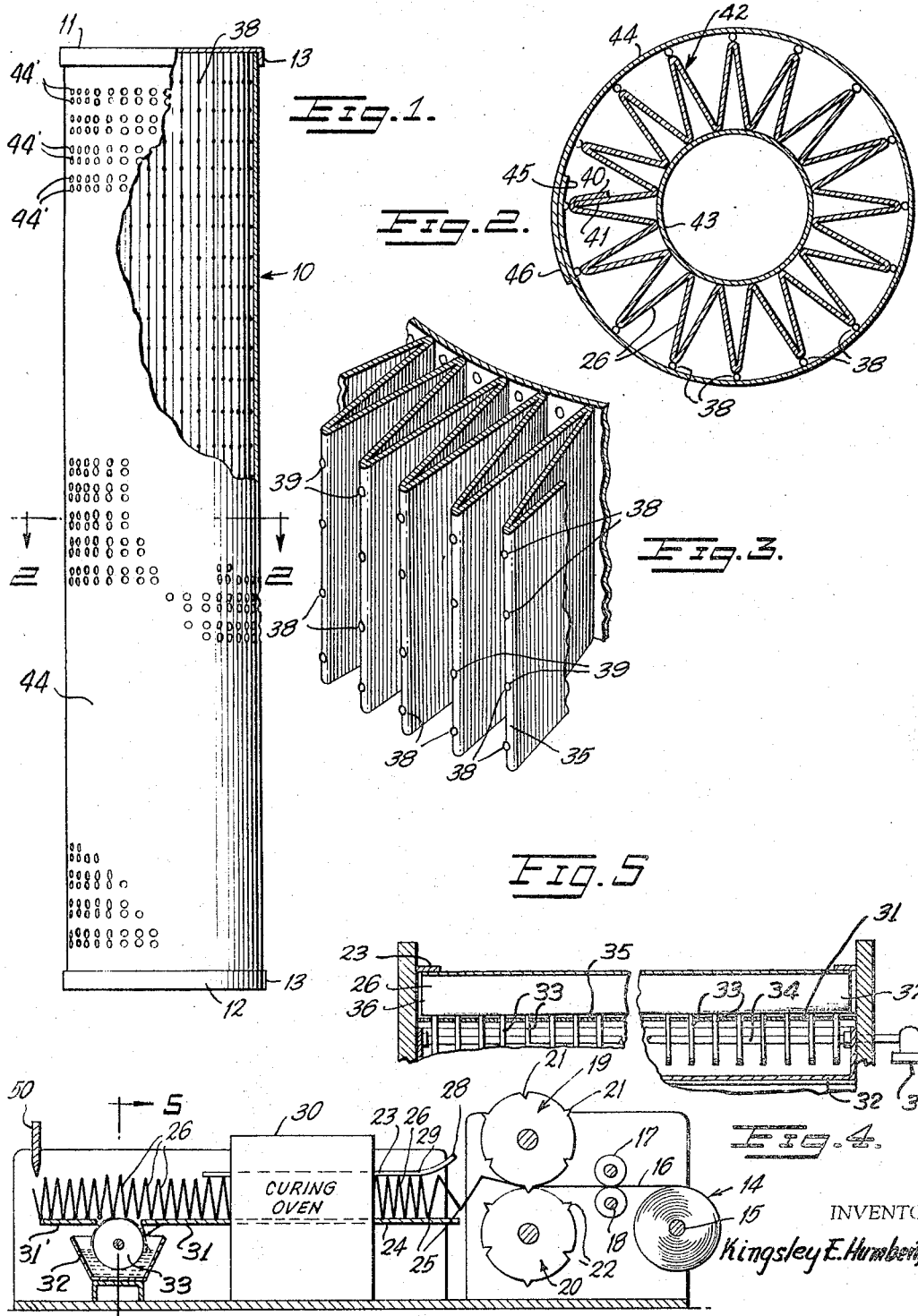

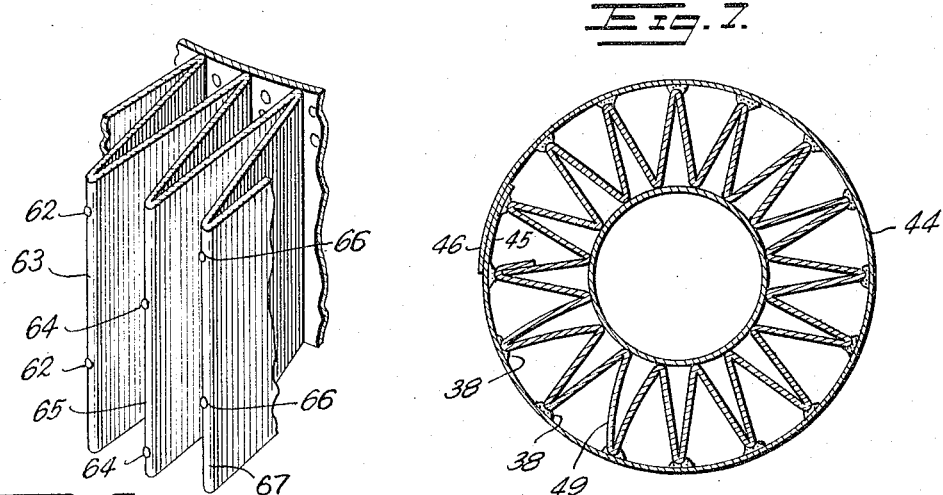
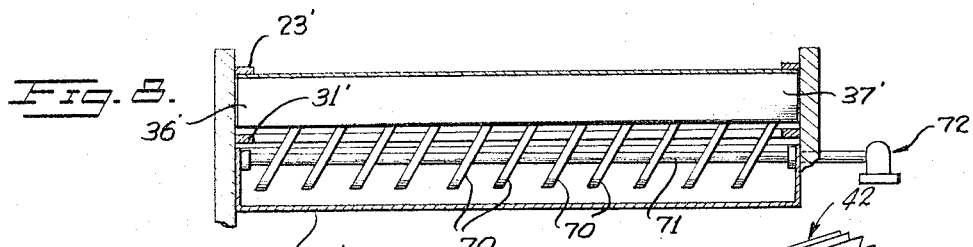
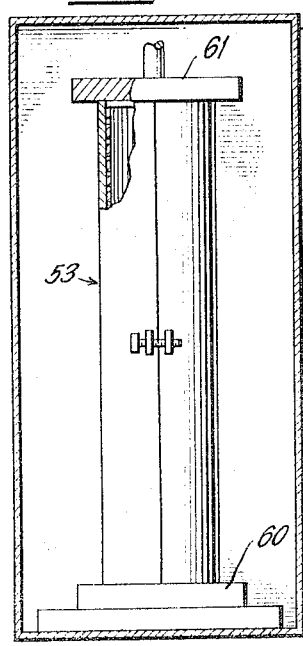
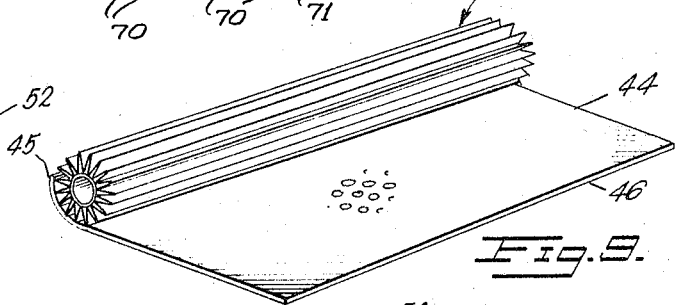
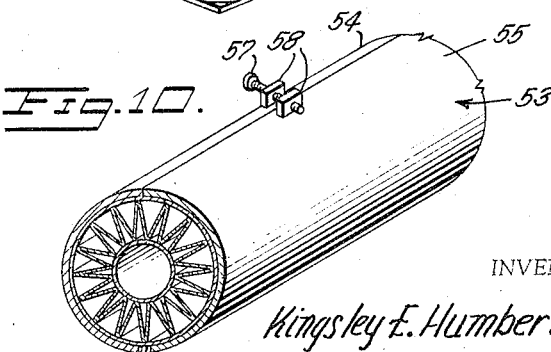
INVENTOR
Kingsley E. Humbert, Jr.
BY Shoemaker and Mattare
ATTORNEYS

3,306,794
METHOD OF MAKING A FILTER ELEMENT
Kingsley E. Humbert, Jr., Gastonia, N.C., assignor to Wix Corporation, Gastonia, N.C., a corporation of North Carolina
Filed Feb. 12, 1963, Ser. No. 257,916
5 Claims. (Cl. 156—69)

The present invention relates to a filter and more particularly to a filter having a plurality of convolutions or pleats.

It is an object of the present invention to provide a surface-type filter element made of compound paper and the like.

In such a filter element, the paper is generally arranged in an annulus and is provided with a perforated center member. The paper is generally formed into a plurality of longitudinal pleats or convolutions so that if one is looking at a cross-section of the filter element, it is generally of a star-shaped configuration. The pleats of paper are generally impregnated with a phenolic resin and the paper is generally pleated by well-known pleating machines.

The free ends of the paper are fastened together so that the star-shaped element is of one continuous or single piece of paper. The free ends of the element may be fastened together by cementing, by stitching, or by clamping them together by staple means and the like. The opposite edges or end of the pleats are generally sealed by metal or paper end caps with turned down rims and the end caps are bonded to the edges of the pleats by an adhesive cement. The filtration is generally in an outside-in direction so as to permit the filter element to retain a larger amount of dirt and other contaminants being filtered from a liquid before undue restriction to flow through the element occurs and the filter element requires replacement by a fresh element.

One of the difficulties encountered in the use of such a filter element is that the longitudinal pleats do not always stay properly spaced apart from one another but have a tendency to pinch together or come in contact with each other. That is, since the midportion of the longitudinally extending pleats are not secured to anything, they have a tendency to squeeze together and contact one another, thus blocking off and reducing the surface area of the pleats available for filtration. This is due to the fact that only the end edges of the pleats which are bonded to the end caps are properly secured, whereas the portion of the pleats between the end caps or the portion of the pleats farthest away from the end caps have a tendency to be pushed together by the pressure of the liquid that flows through the pleats.

It is an object of the present invention to provide a filter element having a plurality of longitudinally extending or axial pleats radially disposed in annulus configuration in which the outer edges or side edges of the pleats are properly secured in a predetermined spaced apart relationship so as to utilize the full surface area of the filter element for filtration purposes.

It is another object of the present invention to provide means for properly securing the axial pleats of an annulus of filter paper so that they are properly spaced apart from one another to prevent pinching together of two adjacent pleats.

It is another object of the present invention to provide an elongated filter element in which the opposite ends of the pleats are bonded to end caps and in which other means are provided for properly spacing apart laterally the portion of the pleats between the end caps.

It is another object of the present invention to provide an elongated filter element having a plurality of longitudinally extending pleats radially disposed about a central member in which adhesive means are provided adjacent the outer peaks of the individual pleats to secure the pleats to the perforated body wrapper.

It is another object of the present invention to provide a method and means for securing the portion of the longitudinal pleats between its opposite ends to the body wrapper disposed around an annular filter element in which a minimum of adhesive is required to prevent the pleats from pinching together.

It is another object of the present invention to provide adhesive material deposited on the outer peaks of an annular filter element for securing them to a body wrapper in which a minimum amount of adhesive is used.

It is another object of the present invention to provide a novel method of applying an adhesive cement to predetermined localized areas or spots on each individual peak of a pleat that goes to form the annulus of the filter element.

It is another object of the present invention to provide a thermoplastic, thermosetting adhesive on the peaks of a pleated annulus paper filter element as it comes from the curing oven, so that a series of adhesive dots, in spaced relationship with one another and disposed in longitudinal alignment along the outer edges of the peaks, are provided to properly bond each individual pleat to the body wrapper to space the pleats apart in predetermined relationship.

It is another object of the present invention to provide a method for applying a continuous application of an adhesive cement to localized spots or areas along a continuous sheet of pleated paper coming from a curing oven, so that a body wrapper may be disposed around an annulus of the pleats and the spots of adhesive material cured or set when the end caps or end discs are disposed on the opposite ends of the pleats to seal off the ends thereof.

It is another object of the present invention to provide a resin impregnated pleated paper filter element consisting of a plurality of individual pleats disposed in annular arrangement with adhesive material disposed on the peaks of the pleats, in a dot arrangement so that if one observes the pleats when they are disposed in spaced rows extending around the annulus each row comprising a series of dots in laterally disposed relationship, and the adhesive dots on each peak will be disposed in longitudinal spaced relationship in order to secure the body wrapper to the pleats to prevent the pleats from pinching together, to thereby utilize a simple and efficient means of obtaining the desired results.

It is still another object of the present invention to provide an adhesive material that is deposited and carried by the peaks so that a minimum amount of adhesive can be deposited on the peaks to be effective in bonding the individual peaks to a body wrapper disposed therearound to secure the body wrapper and the peaks together, and prevent the peaks from being displaced and pinching together to decrease the efficiency of the filter.

It is yet another object of the present invention to provide an adhesive material deposited in a dot relationship or manner, on the individual peaks, as distinguished from depositing continuous bands all the way around the peaks and on the side walls of the individual pleats to thereby utilize a minimum amount of material and to further insure that no matter where the peaks contact the circumference of the body wrapper, they will be properly secured thereto.

It is another object of the present invention to provide a method and means for applying rows of adhesive material, forming a series of dots, along the outer peaks of longitudinal peaks of an annular filter element, in which the adhesive dots are deposited in random fashion on adjacent peaks, or in alternating rows on alternate pleats.

In accordance with the present invention, the article is formed and the method of making the article consists of taking a continuous sheet of resin impregnated filter paper and the like and unraveling it from a large supply roll and thereafter forming fold lines or crease lines in the continuous feed of the paper from the paper roll. Thereafter, the paper is fed longitudinally from the roll between friction members so that the paper is caused to slow down and the paper forms a plurality of transversely extending pleats therein along the weakened crease lines, after which the paper is fed through a curing oven to cure the resin with which it is impregnated. The method then consists in feeding an adhesive material such as a combination of thermoplastic and thermosetting adhesive material at spaced intervals along each individual peak of the pleated paper as it passes over a plurality of adhesive feed rollers so that the adhesive material is applied to localized areas of the peak at spaced intervals, and in which a minimum amount of adhesive can be deposited on the peaks for later securing the portion of the peaks between the opposite ends thereof to a circumferential body wrapper applied around the circumference or outer periphery of the peaks.

Various other objects and advantages of the present invention will be readily apparent from the following detailed description when considered in connection with the accompanying drawing forming a part thereof and in which:

FIG. 1 is a side elevation of the filter element embodying the present invention with parts broken away for purposes of illustration;

FIG. 2 is an enlarged transverse section of the filter element of the present invention taken along the lines 2—2 of FIG. 1;

FIG. 3 is an enlarged fragmentary perspective view of the details of the filter element showing the adhesive applied in a dot arrangement to localized areas of the individual peaks of the pleats;

FIG. 4 is a more or less diagrammatic view of the method of forming the filter article of the present invention including the step of applying the adhesive material to localized areas of the individual pleats;

FIG. 5 is a diagrammatic view of the applicator means for depositing the adhesive material at spaced intervals along an individual peak of a pleat that forms the annular filter element of the present invention;

FIG. 6 is an enlarged fragmentary view of another embodiment of the present invention, in which the dots of adhesive material are deposited on alternate pleats out of alignment with each other, or in random fashion;

FIG. 7 is a transverse view similar to FIG. 2, but illustrating the filter element after the dots of adhesive have been cured in the second oven;

FIG. 8 is a diagrammatic view of a modified form of applicator means adapted to deposit the dots of adhesive or alternate peaks out of alignment with each other;

FIG. 9 illustrates the method of circumscribing the body wrapper around the filter annulus after the adhesive has been applied to the peaks;

FIG. 10 is a diagrammatic view of means for pressing the body wrapper against the pleats prior to curing the adhesive dots of cement;

FIG. 11 illustrates the filter element and body wrapper and end caps being cured in an oven to seal the edges of the pleats and bond the pleats and body wrapper to each other.

Referring to the drawings, the reference numeral 10 generally designates a filter element or cartridge having end caps or discs 11 and 12 provided with turned-in rims 13 on the periphery thereof. One of the end caps or both of them are also provided with central openings therein also having turned-in rims similar to 13.

In making the filter element, a roll of resin impregnated paper 14 that has already been impregnated with phenolic resin or the like is first disposed on a tubular member 15.

The continuous roll of paper 14 has its leading longitudinal edge 16 fed between creasing rollers 17 and 18, if desired, so as to produce a plurality of longitudinally extending score lines, or score lines in a longitudinal direction therein.

Thereafter the paper is fed between complementary creasing rollers 19 and 20 with complementary or mating projections 21 and V-shaped recesses 22 on the peripheries thereof so that transverse crease or fold lines are disposed in the paper at predetermined intervals.

Thereafter, the paper 16 is fed between two converging friction plates 23 and 24 and the rate of travel of the paper is caused to slow down so that the paper will bend or fold along the transverse crease lines 25 formed therein by the rollers 19 and 20, and thus cause the paper to form a plurality of individual pleats generally designated 26 transverse to the line of travel of the paper. The friction plates 23 and 24 cause the rate of travel of the paper to slow down and it will be noted that the portion 28 of the upper friction plate, adjacent the rollers 19 and 20 has its leading edge or end disposed so as to guide the paper between the plates and at the point 29, to cause the pleats to slow down.

After the pleats have been formed in the paper, it is then passed through a curing oven 30 in which heat cures the phenolic resin with which the paper is impregnated. For example, the temperature of the curing oven 30 may be maintained at approximately 300° F. and the time it takes for a pleat to pass through the oven may be between a minute and two minutes, depending upon the desired amount of curing wanted.

Thereafter, the pleats 26 emerge from the oven and pass along the table 31 which forms the other end of the friction plate 24. A suitable hopper or tank 32 is provided beneath table 31 and has the top thereof open. A body of a suitable adhesive substance is disposed within the tank, and the adhesive substance is transferred from the tank to the downwardly facing ridges of the pleats by means of a plurality of adhesive applying rollers 33 which extend upwardly through suitable slots provided in plate 31. Rollers 33 are mounted on a common driving shaft 32 which in turn may be connected with any suitable driving means such as an electric motor indicated by reference numeral 35.

Tank 32 extends transversely completely across the lateral dimension of the pleats, and the rollers 33 are preferably spaced apart approximately 2 to 3 inches from one another.

The rollers 33 extend upwardly through the slots a sufficient distance so that engagement with the pleats is assured, and it is apparent that as the pleats move past the rollers and contact the outer surface thereof, each pleat will pick up a plurality of spaced globules or droplets of the adhesive material. The droplets or globules of adhesive material are dispensed only on the peak of the pleats as will be apparent, and the portion 31' of the supporting table beyond the adhesive applying means may be provided with grooves or slots aligned with the rows of adhesive droplets so that the adhesive droplets will not be disturbed passing over any supporting surface.

As will be clear from an inspection of FIG. 5, the droplets are deposited on the peak 35 of each individual pleat at substantially equally spaced increments between the opposite ends 36 and 37 of an individual pleat so that each droplet 38 of the adhesive cement is disposed in longitudinal alignment with the next adjacent droplet on the same peak of the same pleat to form a row, while each droplet on two adjacent peaks indicated as at 39, are disposed or spaced in a lateral relationship with one another to form rows circumscribing the pleats as shown in FIG. 3. The adhesive material used is preferably a combination of a thermoplastic and a thermosetting resin. For example, the thermoplastic material is preferably vinyl chloride or polyvinyl chloride, commonly referred to as plastisol, which makes a very tough, flexible elastomeric vinyl resin when cured. This type of thermoplastic material is of a viscous or thick nature before curing or setting, which material, after setting by heating to a temperature of from 300 to 350° F., is converted into the tough, flexible, resilient material in a solid state. The thermosetting resin generally preferred may be of a phenol formaldehyde resin which is also in a liquid state until it is cured at approximately the same temperature as the thermoplastic material. It is of course apparent that the amount or portions of the thermosetting and the thermoplastic material used may be varied according to that desired, or a thermosetting resin or a thermoplastic resin that has the property of being in a liquid viscous tacky state before curing may be used alone.

Thus, it is apparent that the individual peaks of the pleats as they pass over the adhesive dispenser, have a minimum amount of adhesive cement applied thereto in a predetermined, localized area, so that the individual droplets of cement are spaced in a row longitudinally of an individual pleat, and with respect to a plurality of adjacent pleats, the droplets are spaced in rows laterally of each other in a dot arrangement when a predetermined number of pleats are formed into an annulus configuration.

Thereafter, a predetermined number of pleats are cut off of the leading edge of the sheet 16 by any well-known means such as cutter knife 50, and thereafter are formed into an annulus or star configuration as shown in FIG. 2. The loose or free ends 40 and 41 of the pleated annulus 42 may be stitched together, or cemented together by the same type of adhesive material dispensed from the vessel 32. Thereafter, the filter annulus 42 is disposed about a perforated metal member 43 commonly referred to as a center tube and a perforated paper member 44, generally known as a body wrapper, is disposed around the periphery of the pleats or circumscribed about annulus 42.

A perforated member 44 is provided with a plurality of holes 44' which are indicated as being disposed in annular circumferentially extending rows as seen in FIG. 1. These rows of holes 44' may be spaced as indicated so as to provide non-perforated areas extending annularly about the paper member, these non-perforated areas being aligned axially of the filter with the rows of adhesive droplets disposed on the peaks of the pleats of the annulus portion of the filter. On the other hand, if desired, the body wrapper can be perforated completely throughout its area, and the non-perforated annular areas eliminated if desired.

The body wrapper is circumscribed about the annulus as illustrated in FIG. 9 by laying the annulus on its side, adjacent the free end 45 of the body wrapper. At this time, the annulus has already been coated with the globules or droplets 38 of adhsive cement on its peaks. The annulus is rolled up in the wrapper from the end 45 until the opposite end 46 of the body wrapper overlaps it, as shown in FIG. 7, so that the dots of adhesive cement on each peak of the pleat contact the inner surface of the wrapper, as shown in FIG. 2. It is, of course, realized that adhesive cement similar to the same adhesive material used to provide the dots 38 on the peaks of the annulus is applied longitudinally of the free end 45 of the body wrapper so that it will adhere to the outer surface of the free end 45.

After the body wrapper has been circumscribed in the manner described about the annulus, the tacky viscous nature of the adhesive cement will hold the pleats and wrapper together sufficiently until the entire assembly can be enclosed in a fixture or a clamp means for depositing the unit in a curing oven 52 shown in FIG. 11. As shown in FIG. 7, the body wrapper can be circumscribed about the annulus so that some of the pleats are bowed as indicated at 49, should the radial length of the pleats vary in length. This insures each and every pleat being in contact with the adhesive cement dots so that each pleat will be properly secured in a predetermined relationship with respect to the other plates. Thereafter, adhesive cement similar to the adhesive cement used for the droplets 38 is applied to the inner surface of the end caps or discs 11 and 12 and the end discs are adhered to the opposite ends of the pleated annulus as shown in FIG. 1. The filter element is thereafter enclosed within a split sleeve member 53 which maintains pressure against the body wrapper and the pleats so that the shape shown in FIG. 7 will be assumed. The split sleeve member 53 comprises complementary sections or halves 54 and 55 hinged or pivoted together throughout the length thereof as indicatesd at 56, a threaded screw clamp 57 is disclosed on the sleeve member opposite the hinged portion and consists of two aligned threaded ears or blots 58 with a threaded screw member extending therethrough. The sleeve member applies continuous pressure against the filter element during the curing process. Heavy metal end plates 60 and 61 are positioned against the opposite end cap as shown in FIG. 11 to apply pressure against the end caps to bond the end caps to the edges of the pleats to seal them off during the curing process.

When the filter element is ready to be cured, it is placed in the oven 52 as diagrammatically illustrated in FIG. 11. Thereafter the pressure and the heat of the curing oven, cures or solidifies or sets the adhesive cement to a hardened state. The temperature maintained in the curing oven 52 is preferably approximately 300° F. and the time of curing is preferably from one minute to two minutes. After the curing process, the element is then removed from the oven and the sleeve member and plates 60 and 61 removed from the filter element and it is ready to be used.

Referring to the modified embodiment of the filter element shown in FIG. 6, this filter element is made in substantially the same way as that already described for the element shown in FIG. 3, except that the row of adhesive cement droplets 62 on one pleat 63 are out of alignment with the adhesive cement droplets 64 on an adjacent pleat 65.

In carrying out the method for producing this modified filter element substantially the same method is utilized as described in connection with the filter element shown in FIG. 3 except that the adhesive applying means is modified as indicated in FIG. 8. In this figure the parts corresponding to those shown in FIG. 5 are given the same reference numeral primed. A plurality of rollers 70 are mounted on a common drive shaft 71 which in turn is adapted to be driven by any suitable driving means such as an electric motor 72. The rollers 70 extend upwardly through a suitable slot provided in the plate 31', and it will be noted that in this modification the rollers are canted or disposed obliquely to the axis of rotation of the driving shaft 71. The rollers will operate in the same manner as previously described so as to apply droplets of adhesive substance to the downwardly facing peaks of the pleats, but due to the inclination of the rollers 70, the droplets applied to successive pleats will not be aligned with one another as will be apparent.

As seen in FIG. 6, the droplets of adhesive cement 62 on pleat 63 are out of alignment with the droplets 64 on the next adjacent pleat 65. The droplets 66 which are in turn deposited on the next adjacent pleat 67 are, of course, out of line with the droplets 64 of the previous pleat and may either be again in alignment with the droplets 62 on pleat 63 such that the droplets of alternate pleats are aligned, or the droplets 66 may be out of alignment with both the droplets 62 and 64 if desired.

Thus, this embodiment of the invention provides spaced rows of droplets of adhesive cement on the pleats, as before, except that they are out of alignment with each other laterally, or in short, a random pattern is provided.

Thus, with the present invention a novel filter element is provided in which the individual peaks of a filter annulus are bonded to a body wrapper circumscribing the annulus by a plurality of spaced dots or rows of adhesive cement in order to ensure an elongated filter element or cartridge, such as those between 24 inches and 36 inches in length, will not have the indiivdual pleats displaced when liquid under pressure is flowed through the filter element for filtration.

With the article of the present invention and the method of depositing the adhesive cement to the specific local area along the edges of the peaks, a minimum amount of adhesive cement is used in order to bond the peaks to the body wrapper, and thus, a simple and efficient article and method of applying the adhesive, that can fit into a production line or a mass assembly line, for producing thousands of throw-away type pleated filter elements is produced.

In accordance with the present invention, it is apparent that the small amount of adhesive deposited to the peaks in no way interferes with realizing the full filtration efficiency of the side walls of each pleat.

Thus, the present invention provides a novel article and method of providing a thermoplastic, thermosetting adhesive cement on the peaks only of a pleated paper filter element, so that a series of adhesive cement dots or droplets are provided on the peak in spaced, circumferential lines or rows in order to properly bond the pleats to the body wrapper, circumscribing or surrounding the pleated annulus to properly position them and space them apart in a predetermined relationship.

The present invention further provides an article and a method of applying adhesive cement to individual peaks in localized areas with pin-point precision and in which depositing of the cement on the peaks of the pleats, as distinguishes from depositing it on a body wrapper normally wrapped therearound, means that the droplets of adhesive are effective to contact the body wrapper, no matter where they contact the circumference of the body wrapper.

Inasmuch as various changes may be made in the form, location and relative arrangement of the several parts without departing from the essential characteristics of the invention, it will be understood that the invention is not to be limited except by the scope of the appended claims.

I claim:
1. The method of forming a filter element into pleats with peaks comprising pleating a sheet of filter paper, depositing a plurality of spaced apart spots of adhesive material along the peaks of said pleats, forming the pleats into an elongated annulus, assembling a foraminous center tube of substantially the length of said annulus with said annulus, placing a foraminous body wrapper of substantially the length of said annulus around the outside of said annulus in contact with said spots of adhesive and bonding the two together, securing end caps on the opposite ends of said filter element, and thus forming a unitary throw-away type filter element.

2. The method of claim 1 wherein the adhesive material is a thermosetting material.

3. The method of claim 1 wherein the adhesive material is a thermoplastic material.

4. The method of claim 1 wherein the adhesive material is a mixture of a thermoplastic and thermosetting resin.

5. The method of claim 4 wherein the thermoplastic resin is polyvinyl chloride and the thermosetting resin is a phenolic resin.

References Cited by the Examiner

UNITED STATES PATENTS

| 2,039,312 | 5/1936 | Goldman | 210—508 X |
| 2,207,279 | 7/1940 | Alderfer | 156—291 X |
| 2,712,174 | 7/1955 | Hubbell | 156—291 X |
| 2,915,426 | 12/1959 | Poelman | 210—493 X |
| 2,919,807 | 1/1960 | Briggs | 210—493 X |
| 3,042,571 | 7/1962 | Jackson | 210—493 |
| 3,058,593 | 10/1962 | Gruner | 210—493 |

REUBEN FRIEDMAN, *Primary Examiner.*
HERBERT L. MARTIN, J. DE CESARE,
*Assistant Examiners.*